(12) United States Patent
Aloisio

(10) Patent No.: US 7,519,147 B1
(45) Date of Patent: Apr. 14, 2009

(54) CARGO CONTAINER X-RAY APPARATUS

(76) Inventor: Marc Aloisio, 413 SE. 5th St., Dania Beach, FL (US) 33004

( * ) Notice: Subject to any disclaimer, the term of this patent is extended or adjusted under 35 U.S.C. 154(b) by 0 days.

(21) Appl. No.: 11/750,759

(22) Filed: May 18, 2007

(51) Int. Cl.
*G01N 23/04* (2006.01)

(52) U.S. Cl. ....................................... 378/57

(58) Field of Classification Search ............... 378/57, 378/193–198, 210
See application file for complete search history.

(56) References Cited

U.S. PATENT DOCUMENTS

| | | | |
|---|---|---|---|
| 4,430,568 A | 2/1984 | Yoshida et al. | |
| 4,833,625 A * | 5/1989 | Fisher et al. | 345/668 |
| 6,768,421 B1 | 7/2004 | Alioto et al. | |
| 6,778,631 B2 | 8/2004 | Franke | |
| 7,209,540 B2 * | 4/2007 | Muhanna et al. | 378/57 |
| 7,267,239 B2 * | 9/2007 | Takehara et al. | 212/270 |

* cited by examiner

*Primary Examiner*—Courtney Thomas
(74) *Attorney, Agent, or Firm*—Crossley Patent Law; Mark A. Crossley

(57) ABSTRACT

A cargo container x-ray apparatus with x-ray projector and receiver for mounting on opposite waterside legs of a crane. As the crane is already in use in transporting the containers from a vessel to a landing area, there exists little to no delay in unloading, as inspection of each container is inherent in its transport. The apparatus provides fiber optics for transmitting the x-ray images to a centralized viewing location. By providing transmission to and a large, high resolution viewing screen in a central location, the need for added personnel is negated. As each container must be conveyed by the crane, the inspection of the container takes place in transit.

1 Claim, 3 Drawing Sheets

CARGO CONTAINER X-RAY APPARATUS

BACKGROUND OF THE INVENTION

National security and United States laws attempt to control what enters our borders. This holds true with shipping docks located in various ports about the country. Current procedures are time consuming and ineffective. A large portion of the ineffectiveness of current inspections is the time involved in the inspections themselves. Currently used X-ray procedures only allow about 1% of all containers to be x-rayed. This procedure is therefore largely ineffective. What is needed is a means for x-raying containers which does not slow cargo unloading or place undo burden on time schedules or personnel. The present apparatus provides the solution to these problems.

FIELD OF THE INVENTION

The cargo container x-ray apparatus relates to x-ray equipment and more especially to a cargo container x-ray apparatus which does not slow unloading of vessels and further provides centralized information to officials.

DESCRIPTION OF THE PRIOR ART

Prior related art does not provide the advantages of the present apparatus. For example, U.S. Pat. No. 6,768,421B1 issued to Alioto et al. on Jul. 27, 2004 teaches a container crane radiation detection systems and method. The system and method comprises a radiation detection device mounted on the crane hoist attachment. The device teaches radiation detection at the time of engagement of the crane, prior to lifting and removing the container from the ship. The device cannot x-ray a container. U.S. Pat. No. 4,430,568 issued to Yoshida et al. on Feb. 7, 1984 teaches a container inspection system that requires containers be conveyed past a machine. Further, the machine does not provide a centralized information display to officials. U.S. Pat. No. 6,778,631B2 issued to Franke on Aug. 17, 2004 teaches a device and method for controlling cargo on crane equipment without contact. The device does not provide x-ray information to a centralized location. The device requires that the containers be driven through the x-ray device. None of the prior art provides the combination of known elements in a way that affords the cost effective and rapid inspection of containers, as does the present apparatus.

While the above-described devices fulfill their respective and particular objects and requirements, they do not describe a cargo container x-ray apparatus that provides for the advantages of the cargo container x-ray apparatus. In this respect, the cargo container x-ray apparatus substantially departs from the conventional concepts and designs of the prior art. Therefore, a need exists for an improved cargo container x-ray apparatus.

SUMMARY OF THE INVENTION

The general purpose of the cargo container x-ray apparatus, described subsequently in greater detail, is to provide a cargo container x-ray apparatus which has many novel features that result in an improved cargo container x-ray apparatus which is not anticipated, rendered obvious, suggested, or even implied by prior art, either alone or in combination thereof.

To attain this, the cargo container x-ray apparatus provides for mounting the x-ray projector and receiver on opposite waterside legs of a crane. As the crane is already in use in transporting the containers from a vessel to a landing area, there exists little to no delay in unloading, as inspection of each container is inherent in its transport. The apparatus provides fiber optics for transmitting the x-ray images to a centralized viewing location. By providing transmission and a viewing screen in a central location, the need for added personnel is negated. As each container must be conveyed by the crane, the inspection of the container takes place in transit, then information is sent to a viewing screen. The viewing screen is a large. One embodiment of the apparatus provides at least a 72-inch high-resolution screen. The quality of image provided by the fiber optic communication between the x-ray and the screen, in addition to screen size, provides detailed viewing of cargo. Detailed viewing assists in both detecting small-sized images and in speeding the process of viewing. No added personnel and no added equipment, beyond the apparatus, are needed for cargo container inspection. Time and labor costs are thereby saved. Additionally, all containers are now subject to x-ray inspection, where in present practice only a very small percentage can be inspected. A single inspector can be used to view the screen and control the x-ray equipment remotely from the viewing area. The apparatus thereby provides security against contraband and dangerous cargo in a cost effective manner.

Thus has been broadly outlined the more important features of the improved cargo container x-ray apparatus so that the detailed description thereof that follows may be better understood and in order that the present contribution to the art may be better appreciated.

An object of the cargo container x-ray apparatus is to combine existing technology into a cost effective cargo container x-ray apparatus.

Another object of the cargo container x-ray apparatus is to save labor.

A further object of the cargo container x-ray apparatus is to save money.

An added object of the cargo container x-ray apparatus is to provide added security.

And, an object of the cargo container x-ray apparatus is to prevent illegal cargo entry.

Additionally, an object of the cargo container x-ray apparatus is to provide rapid cargo container inspection within existing transport equipment.

Yet another object of the cargo container x-ray apparatus is to provide detailed imaging of the cargo x-rayed.

Still another object of the cargo container x-ray apparatus is to provide remote control of the apparatus.

These together with additional objects, features and advantages of the improved cargo container x-ray apparatus will be readily apparent to those of ordinary skill in the art upon reading the following detailed description of presently preferred, but nonetheless illustrative, embodiments of the improved cargo container x-ray apparatus when taken in conjunction with the accompanying drawings.

In this respect, before explaining the current embodiments of the improved cargo container x-ray apparatus in detail, it is to be understood that the cargo container x-ray apparatus is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved cargo container x-ray apparatus. It is therefore important that the claims be regarded as including such equivalent constructions insofar as they do not depart from the spirit and scope of the cargo container x-ray apparatus. It is also to be understood that the phraseology and terminology employed herein are for purposes of description and should not be regarded as limiting.

DETAILED DESCRIPTION OF THE DRAWINGS

Figure 1:
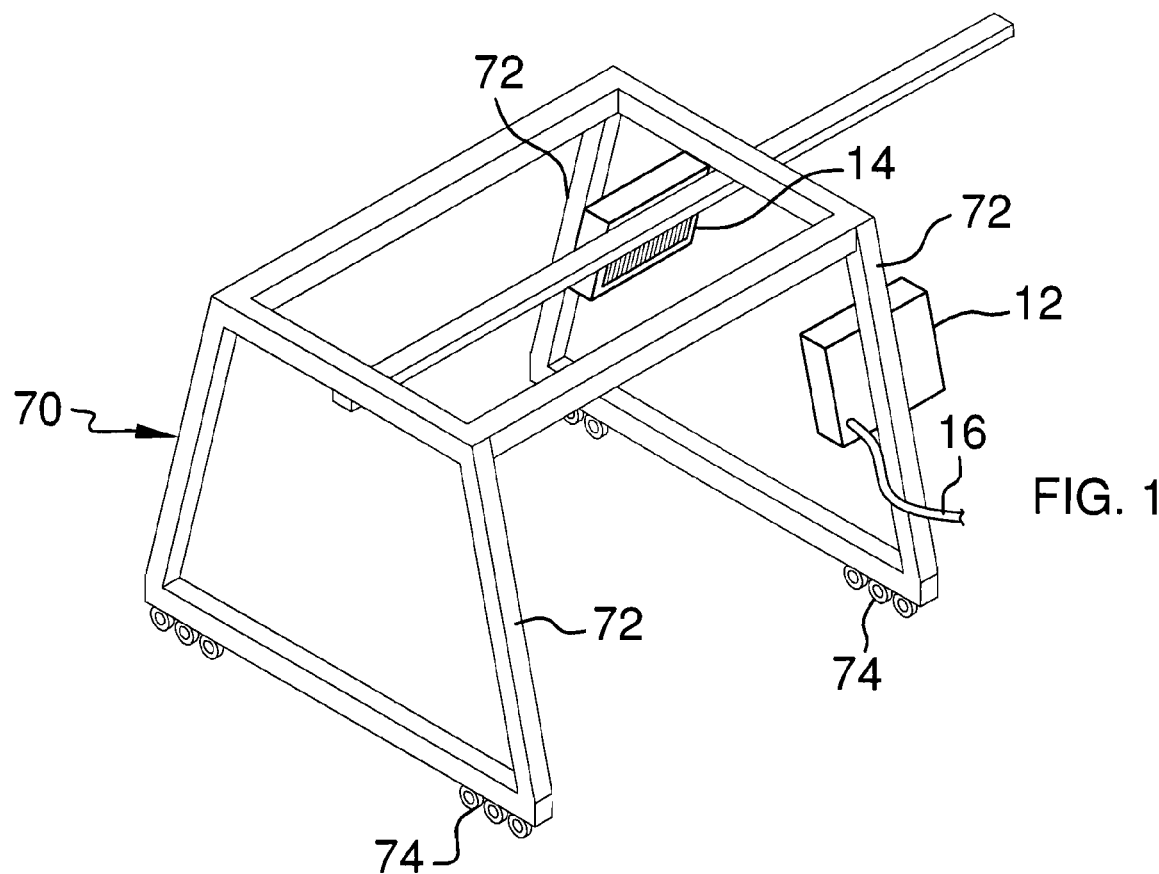
FIG. 1 is a perspective view of a crane with x-ray projector and x-ray receiver of the apparatus installed.
Figure 2:
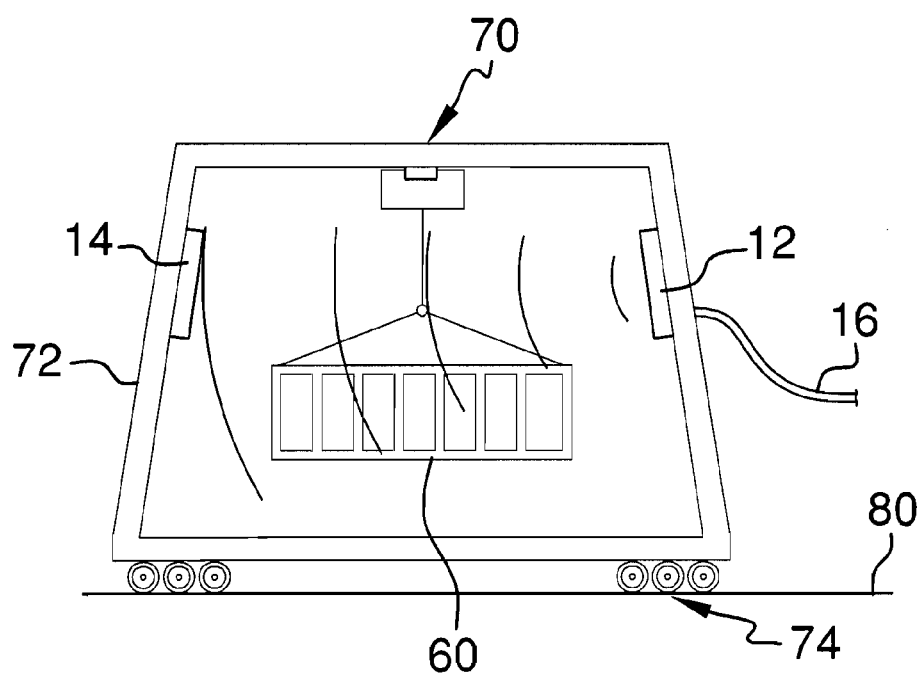
FIG. 2 is an end elevation view of a container undergoing x-ray within the crane.
Figure 3:
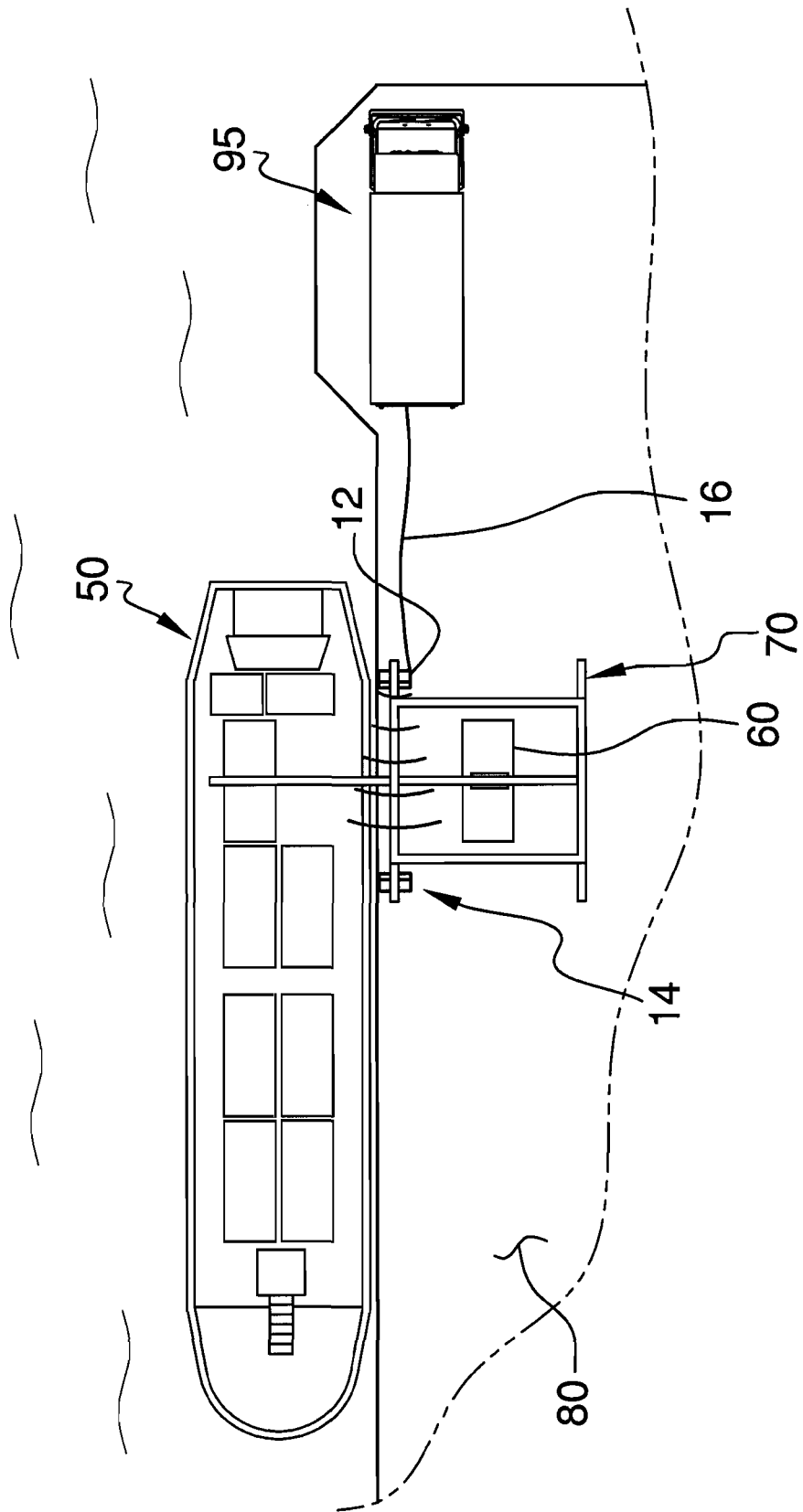
FIG. 3 is top plan view of the apparatus in use in unloading and transport of a container to a shipping dock.
Figure 4:
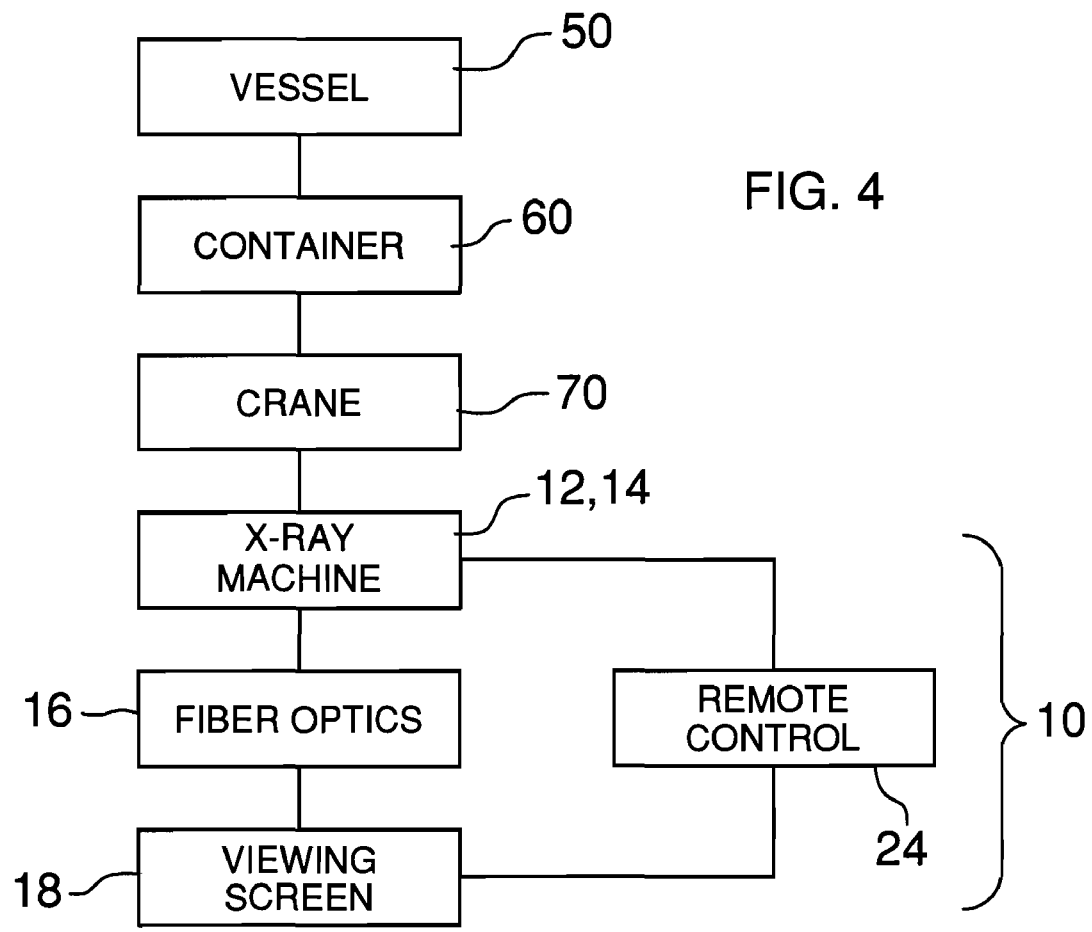
FIG. 4 is schematic block diagram of the apparatus in relationship to existing vessel, container, and crane.
Figure 5:
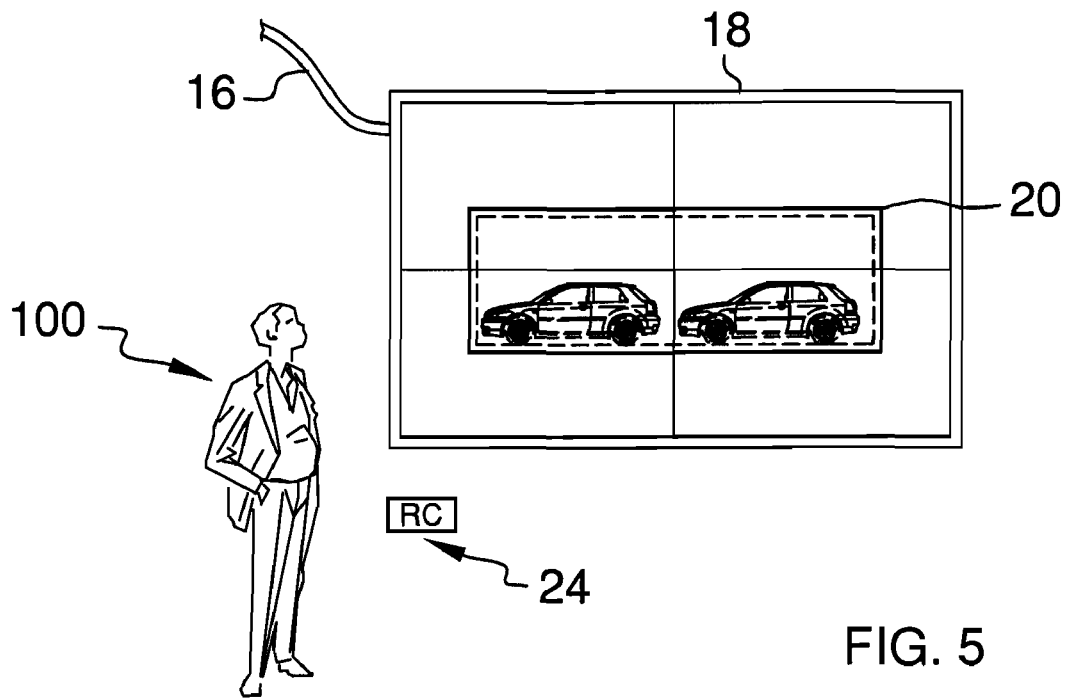
FIG. 5 is a front elevation view of the viewing screen of the apparatus, with remote control.

With reference now to the drawings, and in particular FIGS. 1 through 5 thereof, the principles and concepts of the cargo container x-ray apparatus generally designated by the reference number 10 will be described.

Referring to FIGS. 1-5, the cargo container x-ray apparatus 10 is provided for x-ray viewing of cargo containers 60. Existing cranes 70 provide a framework for surrounding and supporting a container 60 as it is unloaded from the vessel 50 to the dock 80. The typical crane 70 further comprises wheels 74 for conveyance on the dock 80. The apparatus comprises the x-ray projector 12 for attachment to an existing crane 70 waterside legs 72. The x-ray receiver 14 equipment is attached to the opposite waterside legs 72. The high resolution viewing screen 18 is located as chosen by inspecting official 100. A centralized viewing area 95 such as an existing customs office or the like is ideal for viewing screen 18 location. The viewing screen 18 is at least 72-inch diagonal measurement. Larger screens 18 are also provided. The remote control 24 is provided for control of the viewing screen 18 and the x-ray projector 12 and x-ray receiver 14. Remotely switched control 24 provides that the x-ray projector 12 is not in continual operation. Remote control 24 also negates the need for additional personnel at the x-ray site. The image 20 provided by the high resolution screen 18 and fiber optics 16 insures viewing of which might otherwise be undetectable smaller items of concern.

Mounting hardware (not shown) is provided for attaching the x-ray projector 12 and x-ray receiver 14 to the waterside legs 72.

With respect to the above description then, it is to be realized that the optimum dimensional relationships for the parts of the cargo container x-ray apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the cargo container x-ray apparatus.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the cargo container x-ray apparatus may be used.

Therefore, the foregoing is considered as illustrative only of the principles of the cargo container x-ray apparatus. Further, since numerous modifications and changes will readily occur to those skilled in the art, it is not desired to limit the cargo container x-ray apparatus to the exact construction and operation shown and described, and accordingly, all suitable modifications and equivalents may be resorted to, falling within the scope of the cargo container x-ray apparatus.

What is claimed is:

1. A cargo container x-ray apparatus comprising, in combination:
    an x-ray projector for attachment to an existing crane;
    an x-ray receiver for attachment to an opposite spaced apart component of the crane;
    a high-resolution viewing screen of at least 72-inch measurement;
    communication between the x-ray projector, the x-ray receiver, and the viewing screen;
    remote control for the viewing screen and the x-ray projector and x-ray receiver;
    wherein the x-ray projector attaches to a crane waterside legs;
    wherein the x-ray receiver attaches to a crane waterside legs opposite the x-ray projector attachment;
    wherein the communication between the x-ray projector, the x-ray receiver and the viewing screen further comprises fiber optics.

* * * * *